May 12, 1970   R. L. VIERLING   3,511,584
ROTARY FLUID POWER DEVICES
Filed Jan. 22, 1968   7 Sheets-Sheet 1
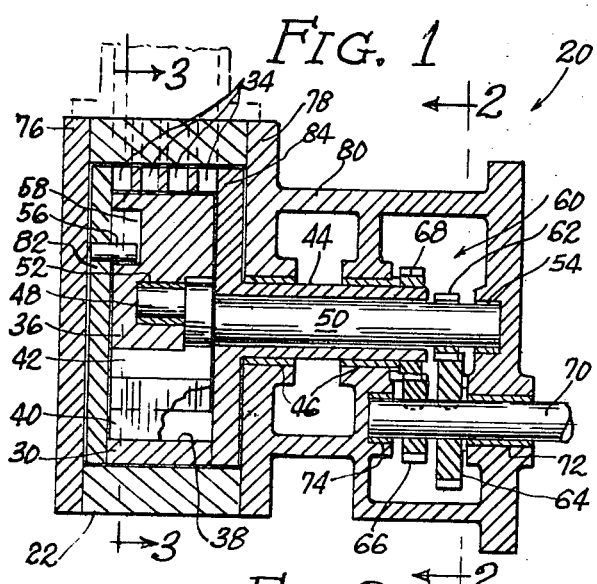
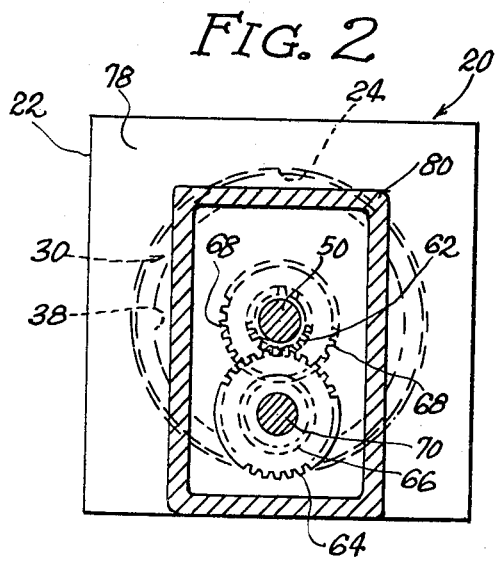
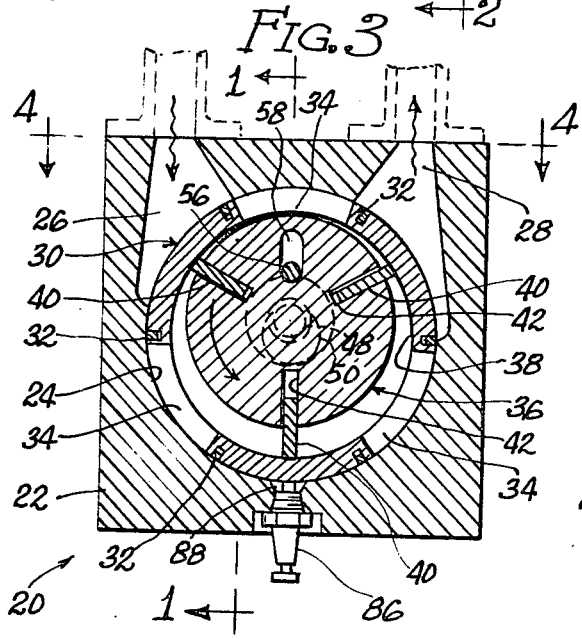
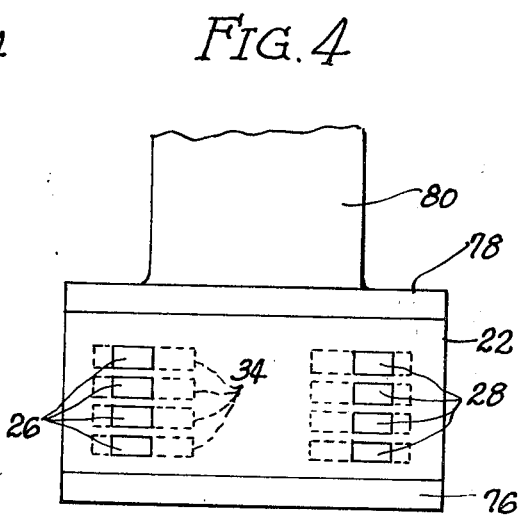
INVENTOR
Robert L. Vierling
by McDougall, Hersh, Scott
and Ladd
Att'ys

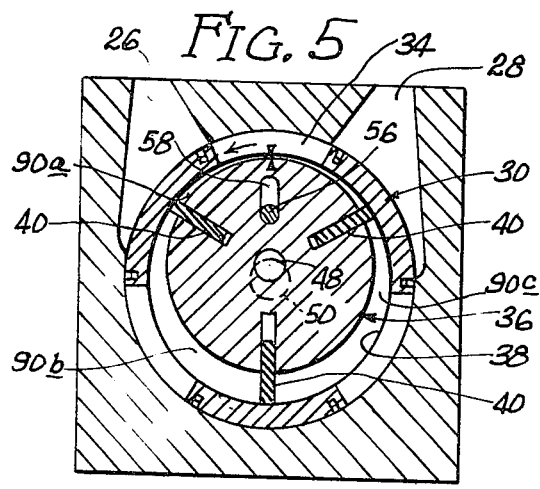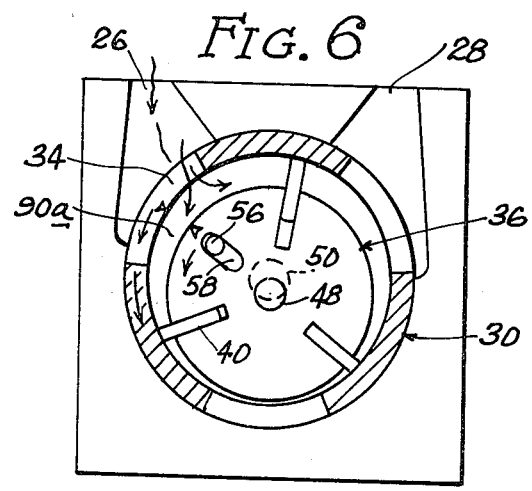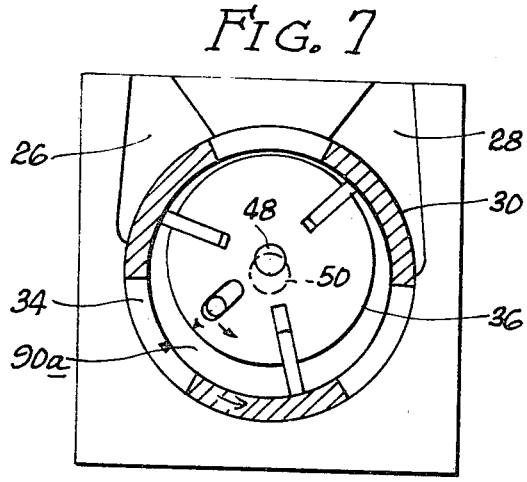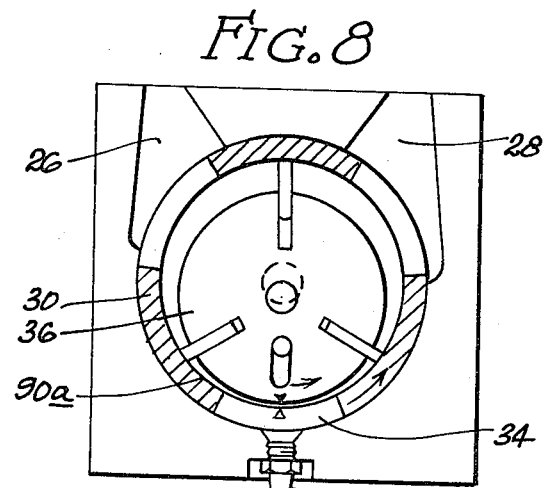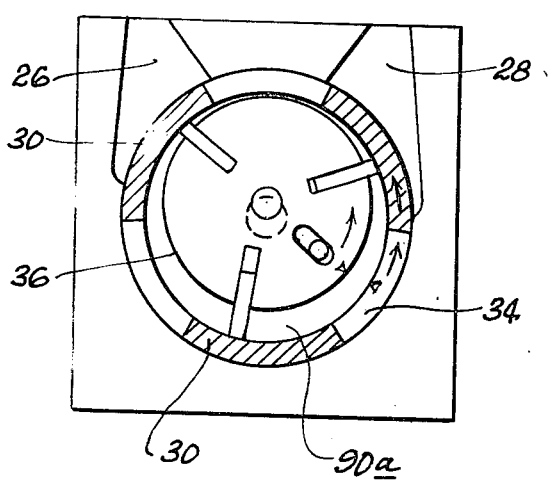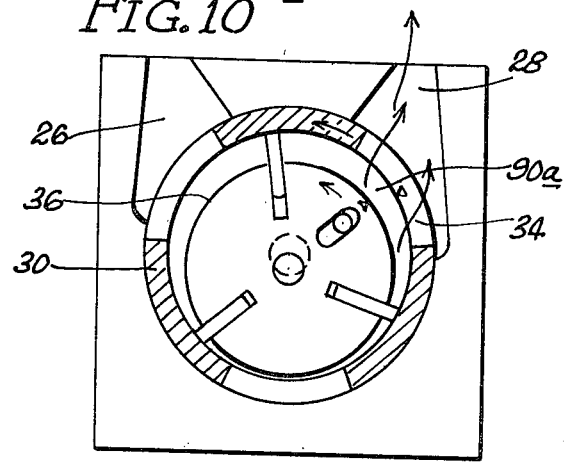

May 12, 1970  R. L. VIERLING  3,511,584
ROTARY FLUID POWER DEVICES
Filed Jan. 22, 1968  7 Sheets-Sheet 3

May 12, 1970     R. L. VIERLING     3,511,584
ROTARY FLUID POWER DEVICES
Filed Jan. 22, 1968     7 Sheets-Sheet 4
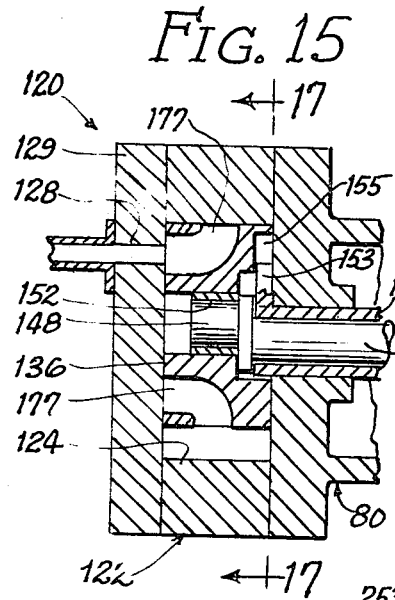
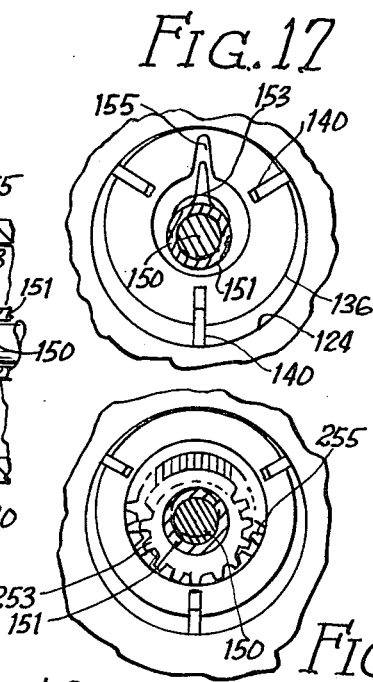
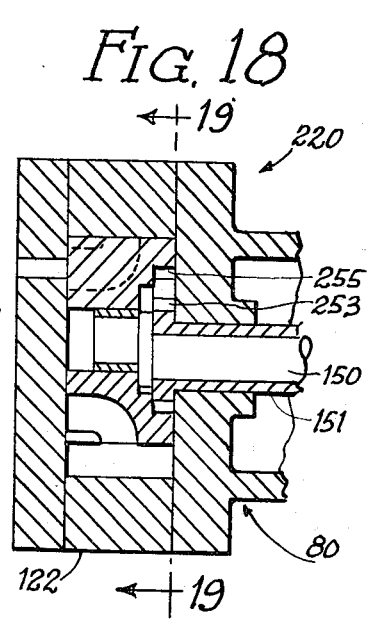
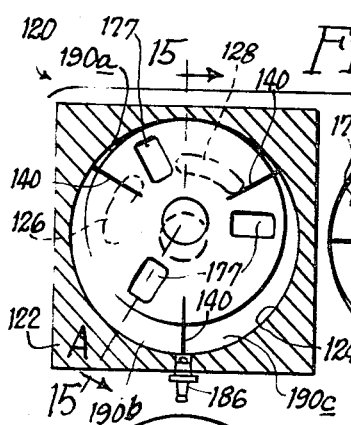
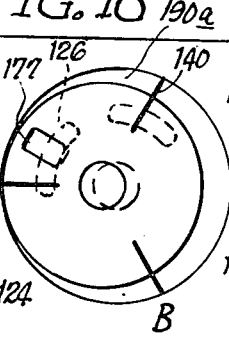
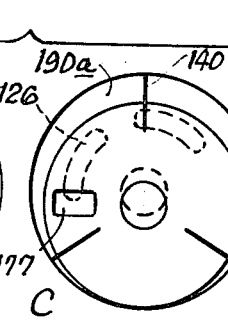
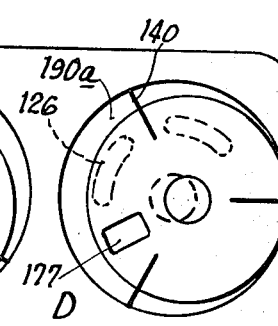
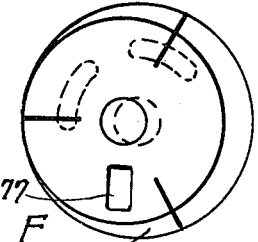
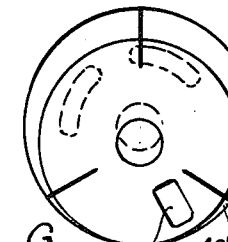
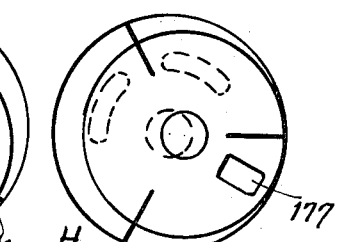
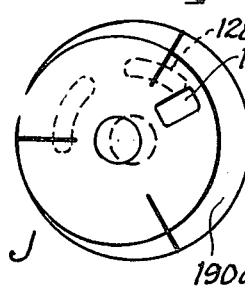
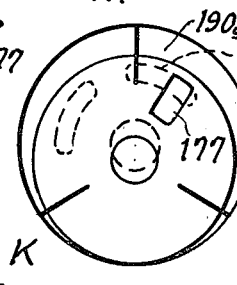
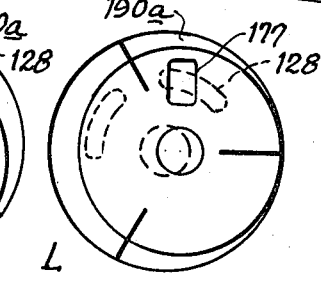

May 12, 1970  R. L. VIERLING  3,511,584
ROTARY FLUID POWER DEVICES
Filed Jan. 22, 1968  7 Sheets-Sheet 5
Fig. 20
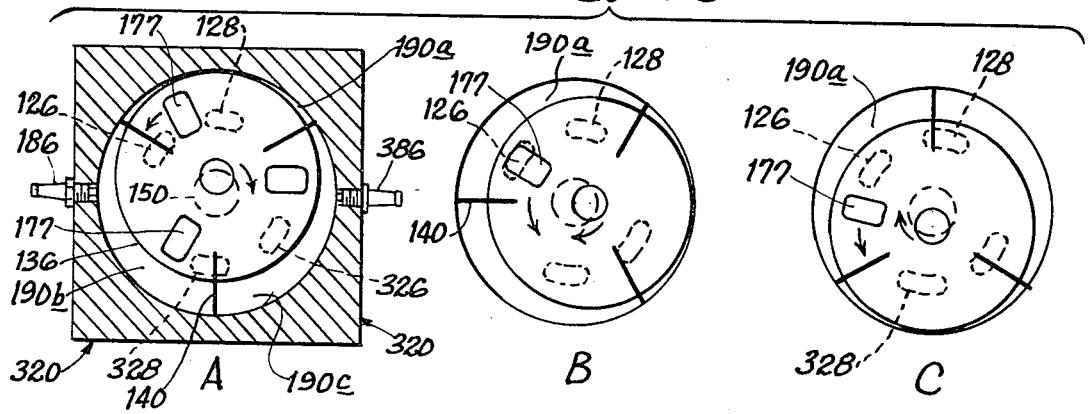
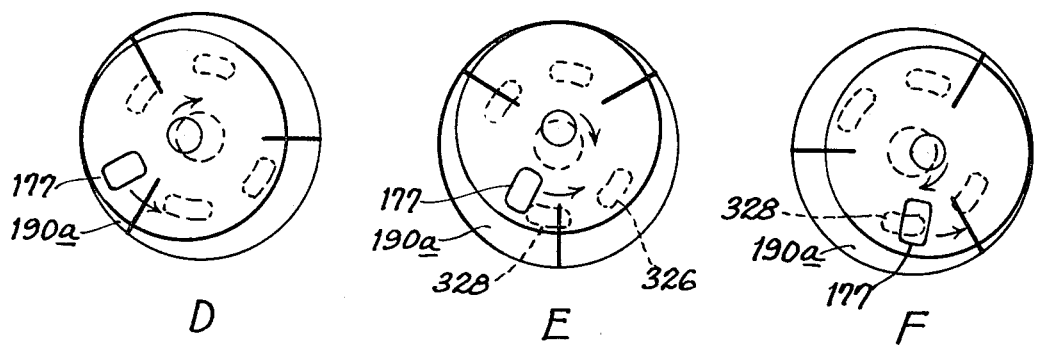
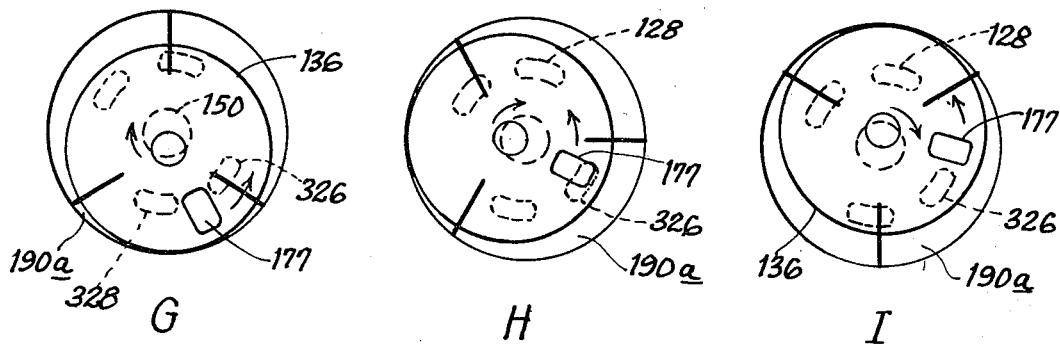
ROTOR TURNING CCW (⅓ REV.)
TO CRANK SHAFT TURNING CW (1 REV.)

May 12, 1970 — R. L. VIERLING — 3,511,584
ROTARY FLUID POWER DEVICES
Filed Jan. 22, 1968 — 7 Sheets-Sheet 6

5 CELL DISPLACEMENT UNITS
ROTATIONS - SAME DIRECTION

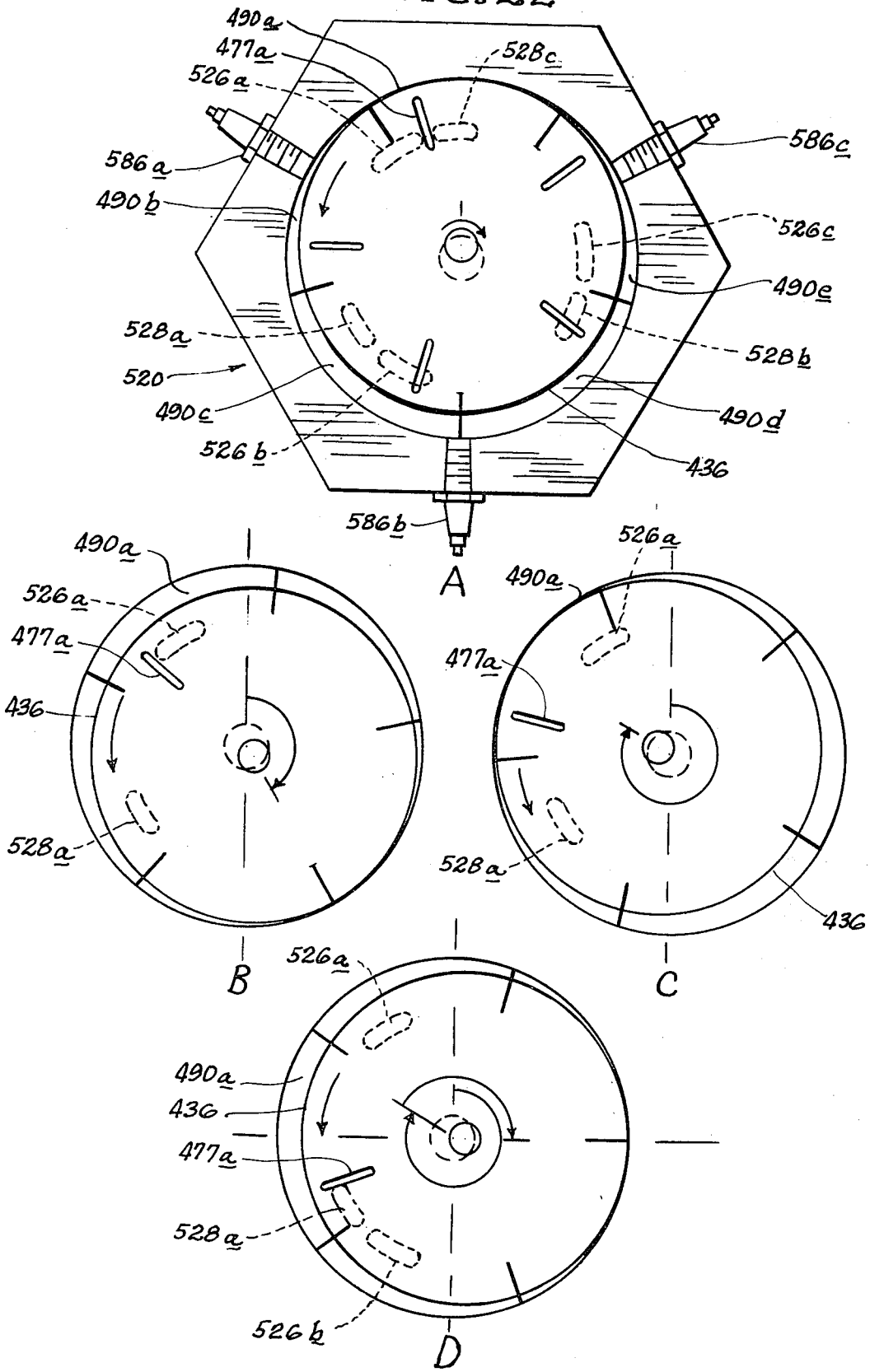

United States Patent Office
3,511,584
Patented May 12, 1970

3,511,584
ROTARY FLUID POWER DEVICES
Robert L. Vierling, 10255 S. Hoyne Ave.,
Chicago, Ill. 60643
Filed Jan. 22, 1968, Ser. No. 699,652
Int. Cl. F04c 1/00
U.S. Cl. 418—61                                    24 Claims

ABSTRACT OF THE DISCLOSURE

A fluid power device having a rotor disposed eccentrically in a cylindrical chamber formed with fluid-carrying ports, said rotor having a plurality of extensible and retractable vanes for engaging the inside of the chamber to divide the chamber into a plurality of spaces of variable volume. In certain embodiments, the chamber is formed in a gate rotor which is closely received in an additional cylindrical chamber formed in a stationary casing. Intake and exhaust ports connect with the additional chamber. In one embodiment, the main rotor is caused to orbit about the axis of the gate rotor, preferably at a rotary speed which is related to but different from the rotary speed of the gate rotor. The main rotor is caused to rotate with the gate rotor. To produce an internal combustion engine, fuel ignition means may be provided in the additional chamber between the intake and exhaust ports. In another embodiment adapted to provide a fluid power motor or pump, the main rotor is caused to rotate with the gate rotor, but about an eccentric axis which is stationary. In still another embodiment, adapted to provide a fluid power motor or pump, the first mentioned rotor is rotatable relative to the chamber, which is formed in a stationary casing. The rotor is caused to orbit in the chamber, preferably at a rotary speed which s related to but different from the rotary speed of the rotor. An engine of this type may also be provided.

---

This invention relates to rotary fluid power devices, such as internal combustion engines, fluid power motors, and pumps, for example.

Many rotary fluid power devices have been proposed in the past, but characteristically they have been very difficult to manufacture, due to such factors as the use of odd shaped rotors and odd shaped chambers which are difficult and expensive to machine. Moreover, severe sealing difficulties have been experienced with prior devices, particularly devices intended to function as internal combustion engines. Characteristically, the seals have been inefficient and subject to rapid wear. In many prior devices, the lubrication of the seals has been very difficult and inefficient. One factor tending to prevent reliable lubrication is the extremely high temperature to which the seals are subjected. The prior devices have been characterized by high surface speeds between the seals and the casing walls. The high surface speeds have caused rapid wear, particularly in the absence of efficient lubrication.

The present invention provides rotary fluid power devices which are usable as internal combustion engines, fluid power motors, and pumps. The devices of the present invention are highly efficient and easy to manufacture. The devices of the present invention have the advantage of being able to utilize cylindrical rotors which are movable in cylindrical chambers. Inasmuch as they are cylindrical, the rotors and chambers are easy to machine with a high degree of precision. The devices of the present invention have the additional advantage of utilizing seals which are highly efficient and long lasting.

The disclosed embodiments of the present invention utilize a rotor which is eccentrically disposed in a generally cylindrical chamber. The rotor comprises a plurality of extensible and retractable vanes which divide the chamber into a plurality of spaces of variable volume. The chamber is provided with fluid-carrying ports.

In certain embodiments, the cylindrical chamber is formed in a cylindrical gate rotor, rotatably received in an additional chamber in an outer casting. Intake and exhaust ports connect with the outer chamber. Means are provided to cause the main rotor to rotate with the gate rotor, so that there is very little surface movement between the vanes and the gate rotor. Thus, the wear on the vanes is very low. Simple rotary seals may be provided between the gate rotor and the outer casing.

In one embodiment, the main rotor is caused to orbit about the axis of the gate rotor. Driving means are connected between the orbiting means and the gate rotor, so that the main rotor is orbited at a rotary speed which is related to the rotary speed of the gate rotor. However, the rotary speeds are preferably different. For example, for a rotor having three vanes, the orbiting speed may be three times the rotary speed of the gate rotor. This embodiment is adapted to provide an internal combustion engine. Fuel ignition means may be provided in the outer casing, between the intake and exhaust ports.

In another embodiment, adapted to provide a fluid power motor or pump, the main rotor rotates about a stationary axis which is eccentric relative to the rotary axis of the gate rotor. The main rotor is caused to rotate at the same rotary speed as the gate rotor.

In still another embodiment, the gate rotor is eliminated. The main rotor rotates in a cylindrical chamber formed in a stationary casing. The rotor is caused to orbit about the axis of the stationary casing, at a speed related to the rotary speed of the rotor. The orbiting speed is preferably different from the rotary speed. Thus, for a rotor having three vanes, the orbiting speed may be three times the rotary speed.

Various other objects, advantages and features of the present invention will appear from the following description, together with the accompanying drawings, in which:

FIG. 1 is a diagrammatic longitudinal section of a fluid power device, to be described as an illustrative embodiment of the present invention, the view being taken generally along the line 1—1 in FIG. 3.

FIG. 2 is an elevational section, taken generally along the line 2—2 in FIG. 1.

FIG. 3 is a section taken generally along the line 3—3 in FIG. 1.

FIG. 4 is a diagrammatic plan view, taken generally as indicated by line 4—4 in FIG. 3.

FIGS. 5–10 are sectional views, similar to FIG. 3, showing successive positions of the rotor during the operation of the fluid power device.

FIG. 15 is a fragmentary longitudinal section showing a third embodiment.

FIG. 16 is a series of diagrammatic sectional views, A–L, showing the operation of the device of FIG. 15.

FIG. 17 is a fragmentary section, taken generally along the line 17—17 in FIG. 15.

FIG. 18 is a view similar to FIG. 15 but showing a modified construction.

FIG. 19 is a fragmentary section, taken generally along a line 19—19 in FIG. 18.

FIG. 20 is a series of diagrammatic views, A–I, similar to FIG. 16, but showing a modified construction, in which the rotor rotates and orbits in opposite directions.

FIG. 22 is a series of diagrammatic views, A–D, similar to FIG. 21, but showing still another modified construction in which the five-vaned rotor rotates and orbits in opposite directions, rather than in the same direction.

Figure 11:
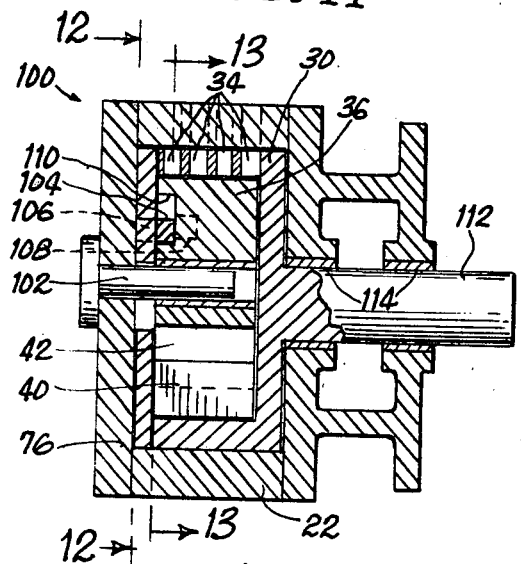
FIG. 11 is a longitudinal section of another fluid power device, to be described as a second embodiment of the present invention, the view being taken generally along the line 11—11 in FIG. 12.

As already indicated, FIG. 1 illustrates a rotary fluid power device 20 which is especially well adapted for use as an internal combustion engine, but may also be arranged for use as a fluid motor or pump. As shown, the device 20 comprises a casing or block 22 having a generally cylindrical chamber 24 therein. The casing 22 is formed with intake and exhaust ports 26 and 28 which connect with the chamber 24.

The illustrated device 20 is provided with a generally cylindrical gate or cage rotor 30 which is closely received in the cylindrical chamber 24. Rotary seals 32 are preferably provided between the cage rotor 30 and the inside of the cylindrical chamber 24. A plurality of ports 34 are formed in the cage rotor 30. The illustrated cage rotor 30 has three such ports 34.

In the fluid power device 20, a main rotor 36 is disposed within a generally cylindrical chamber or bore 38, formed in the cage rotor 30. The inner chamber 38 is concentric with the outer chamber 24.

The illustrated rotor 36 is generally cylindrical and is eccentrically disposed in the chamber 38. The rotor 36 is fitted with a plurality of generally radial vanes 40 for engaging the inside of the casing 38. The vanes 40 are extensible and retractable, so that they will constantly engage the inside of the chamber 38. As shown, the vanes 40 are slidably mounted in radial slots 42 formed in the rotor 36. The vanes 40 are pressed outwardly by fluid pressure, due to the entry of the pressure fluid into the slots 42. The vanes 40 are also urged outwardly by centrifugal action.

The cage rotor 30 is rotatable about its own axis, which coincides with the axis of the outer chamber 24. As shown to best advantage in FIG. 1, the illustrated cage rotor 30 is supported by a hollow rotatable shaft 44, mounted in bearings 46.

The illustrated main rotor 36 is rotatable about its own axis, which, however, is eccentric relative to the axis of the cage rotor 30. Moreover, the main rotor 36 is preferably caused to orbit about the axis of the cage rotor 30. In the illustrated construction, the main rotor 36 is rotatably mounted on a crank pin 48, formed integrally with a crank shaft 50. The crank pin 48 is eccentric relative to the shaft 50. A bearing 52 is preferably mounted within the main rotor 36 and is rotatably mounted on the crank pin 48. It will be seen that the crank shaft 50 is rotatably received within the hollow shaft 44. The remote end of the crank shaft 50 extends out of the hollow shaft 44 and is supported by a bearing 54.

It will be evident that rotation of the crank shaft 50 will cause orbiting of the main rotor 36 within the cylindrical chamber 38 formed in the cage rotor 30. Preferably, the main rotor 36 is caused to rotate at the same rotary speed as the cage rotor 30. In the illustrated construction, this operation is accomplished by means of a pin and slot connection between the rotors 30 and 36. The pin and slot connection causes the main rotor 36 to rotate with the cage rotor 30, while providing for the orbiting of the main rotor 36. As shown, a pin 56 is mounted on the cage rotor 30. The pin 56 is slidably received in a slot 58, formed in the main rotor 36.

A driving mechanism 60 is preferably provided, whereby the main rotor 36 is orbited at a rotary speed related to the rotary speed of the cage rotor 30. Normally, the rotary orbiting speed is different from the rotary speed of the cage rotor 30. As shown, the drive 60 comprises a train of gears 62, 64, 66, and 68 connected between the crank shaft 50 and the hollow shaft 44, which supports the cage rotor 30. The illustrated gear 62 is secured to the crank shaft 50. The gear 64 meshes with the gear 62 and is secured to another shaft 70, which may be utilized as the output shaft of the fluid power device 20. The shaft 70 is supported by bearings 72 and 74. It will be seen that the gear 66 is also secured to the shaft 70. The gear 68 meshes with the gear 66 and is secured to the hollow shaft 44.

The speed ratio of the driving mechanism 60 may vary, but in the illustrated device 20 the ratio is such that the crank shaft 50 rotates at three times the speed of the cage rotor 30.

The illustrated casing 22 has end walls 76 and 78. A gear box 80 is secured to the end wall 78, for holding the driving mechanism 60.

It will be seen from FIG. 4 that the intake and exhaust ports 26 and 28 are preferably divided into a plurality of adjacent portions or slots, so that the inside of the outer chamber 24 will provide adequate support for the rotary seals 32. Similarly, the ports 34 in the cage rotor 30 are preferably divided into a plurality of adjacent portions or slots, as will be evident from FIG. 1.

The illustrated cage rotor 30 is provided with end walls 82 and 84 which close the ends of the chamber 38. It will be seen that the pin 56 is mounted on the end wall 82. The hollow shaft 44 is connected to the end wall 84.

Provision is made for igniting the fuel in the outer chamber 24. As shown, a spark plug 86 is mounted in an opening 88, connecting with the chamber 24. The spark plug 86 is at an intermediate point in the casing 22, between the intake and exhaust ports 26 and 28. It will be understood that a fuel injector may be used instead of the spark plug 86, if a diesel type engine is desired.

FIGS. 5–10 illustrate successive stages in the operation of the fluid power device 20, when it is arranged to provide an internal combustion engine. It will be understood that the intake port 26 is supplied with a mixture of fuel and air. The exhaust port 28 is adapted to discharge the products of combustion to the atmosphere, preferably by way of a muffler or the like.

The main rotor 36 is smaller than the chamber 38 and is eccentrically disposed therein. The three vanes 40 on the rotor 36 divide the unoccupied portion of the chamber 38 into three spaces 90a, 90b and 90c of variable volume. It will be sufficient to describe the cycle involving the space 90a, inasmuch as the cycles involving the other two spaces 90b and 90c are similar.

In FIG. 5, the main rotor 36 is orbited to its uppermost position, so that the volume of the space 90a is at a minimum, in preparation for the intake portion of the cycle. The rotor port 34, communicating with the space 90a, is in transit between the exhaust port 28 and the intake port 26.

In FIG. 6, the cage rotor 30 and the main rotor 36 have been rotated through approximately 60 degrees, while the main rotor 36 has been orbited through approximately 180 degrees. In the course of such movement, the pertinent rotor port 34 moves opposite the intake port 26. Moreover, the volume of the space 90a is increased, so that the fuel-air mixture is sucked into the space 90a through the ports 26 and 34.

FIG. 7 illustrates the positions of the rotors 30 and 36 after they have been rotated through another 60 degrees, while the rotor 36 has been orbited through another 180 degrees. Thus, by this time, the rotors 30 and 36 have been rotated through a total of 120 degrees, while the rotor 36 has been orbited through a complete revolution. The pertinent rotor port 34 is no longer opposite the intake port 26, but is in transit between the intake and exhaust ports 26 and 28. FIG. 7 represents the beginning of the compression portion of the cycle, in which the fuel-air mixture is compressed in the space 90a.

FIG. 8 represents the position of maximum compression, in which the volume of the space 90a is at a minimum. The rotors 30 and 36 have been rotated through another 60 degrees, making a total rotation of 180 degrees. The rotor 36 has been orbited through another 180 degrees, to its lowermost position. At about this position of the rotors 30 and 36, the spark plug 86 is energized to ignite the fuel in the space 90a. If a diesel cycle is being used, the fuel is injected into the compressed air in the space 90a.

FIG. 8 represents the beginning of the power portion of the cycle, in which the hot gaseous products of combustion are expanded in the space 90a. Meanwhile, the rotor port 34 is still in transit between the intake and exhaust ports 26 and 28.

FIG. 9 represents the positions of the rotors 30 and 36 near the end of the power portion of the cycle. The rotors 30 and 36 have been rotated through another 60 degrees, making a total rotation of 240 degrees. The main rotor 36 has been orbited through another 180 degrees, to complete two full revolutions of the crank shaft 50. The volume of the space 90a has been increased. It will be seen that the pertinent rotor port 34 is still in transit, but is approaching the exhaust port 28.

From the position of FIG. 9, the cage rotor 30 continues to rotate so that the pertinent port 34 moves into communication with the exhaust port 28. The space 90a is thereby connected to the exhaust port so that the exhaust gases can escape. The volume of the space 90a is being reduced so as to force the exhaust gases out of the space 90a and into the exhaust port 28. The total rotation of the rotors 30 and 36 is now 300 degrees, while the total orbiting movement of the rotor 36 is 2½ revolutions.

From the position of FIG. 10, the rotors 30 and 36 rotate to the original position of FIG. 5, so that the volume of the space 90a is reduced to a minimum. In this way, most of the exhaust gases are forced out of the space 90a and into the exhaust port 28. The rotors 30 and 36 have been rotated through one complete revolution, while the main rotor 36 has been orbited through three complete revolutions.

It will be understood that the number of vanes on the rotor 36 may be varied. Instead of using three vanes, five vanes may be employed, for example. In general, any odd number of vanes may be employed. A corresponding number of rotor ports may be employed.

In general, any change in the number of vanes requires a change in the speed ratio between the rotary movement of the rotors 30 and 36 and the orbiting movement of the main rotor 36.

In the illustrated embodiment, the direction of rotation is the same for the orbiting movement and the rotary movement of the rotors. However, the two directions of rotation may be opposite. Any change in the relative directions of rotation of the orbiting and rotary movements may require a change in the speed ratio.

The fluid power device 20 has been described as an internal combustion engine. However, it may also be employed as a fluid power motor or pump. For such use, it is preferred to provide an additional intake port and an additional exhaust port, diametrically opposite from the intake and exhaust ports 26 and 28.

One of the important advantages of the fluid power device 20 resides in the fact that there is very little sliding movement between the vanes 40 and the cage rotor 30. Inasmuch as the main rotor 36 rotates with the cage rotor 30, there is no relative rotation between the vanes 40 and the inside of the chamber 38. There is only the slight oscillating movement due to the orbiting of the main rotor 36. Because the movement between the vanes and the cage rotor 30 is so small, there is very little wear on the vanes. The problem of lubricating the vanes is not difficult or critical. Moreover, the vanes are able to maintain a good seal with the inside of the cage rotor 30.

FIGS. 11–14 illustrate another fluid power device 100 which is similar in most respects to the fluid power device 20 of FIGS. 1–4. To avoid unnecessary repetition of description, the same reference characters are being applied to those components of the fluid power device 100 which are essentially the same as already described in connection with the fluid power device 20. Thus, only the differences between the two fluid power devices 100 and 20 need be described in detail.

Instead of being orbited, the main rotor 36 of the fluid power device 100 is rotatable about a stationary eccentric shaft or pivot 102, which replaces the crank 48. It will be seen that the pivot 102 is mounted on the end plate 76 of the casing 22.

As before, the main rotor 36 is caused to rotate with the cage rotor 30. While the pin 56 and slot 58 of FIG. 1 could be employed for this purpose, FIGS. 11–14 illustrate a modified mechanism, comprising a link 104 which is pivotally connected at its opposite ends to the rotors 30 and 36. Thus, one end of the link 104 is connected to the rotor 30 by a pivot or pin 106. The other end of the link 104 is connected to the rotor 36 by a pivot 108. The link 104 is preferably mounted in a recess 110 formed in the rotor 36. It will be understood that the link 104 oscillates back and forth as the rotor 36 is rotated about an axis which is eccentric relative to the axis of the rotor 30.

Inasmuch as the crank shaft 50 is not needed, the cage rotor 30 is supported by an ordinary shaft 112 which replaces the hollow shaft 44. The shaft 112 is mounted in bearings 114. In this case, the shaft 112 is employed to transmit mechanical power to or from the fluid power device 100. It is not necessary to provide the driving mechanism 60 and the gear box 80 of FIG. 1.

Figure 13:
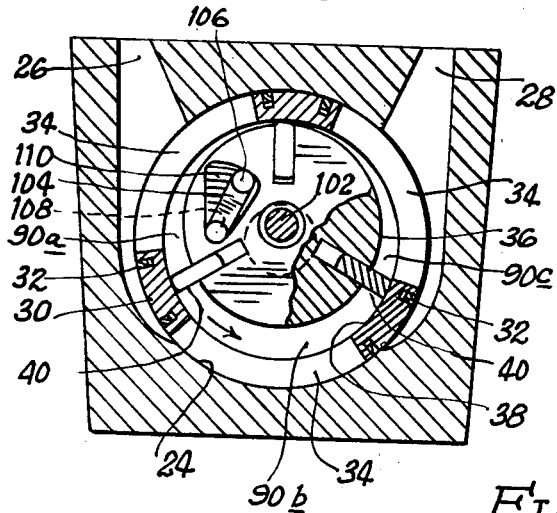
FIG. 13 is a section taken generally along the line 13—13 in FIG. 11.

As shown in FIG. 13, the intake and exhaust ports 26 and 28 are somewhat larger in angular extent than as shown in FIG. 3. Similarly, the rotor ports 34 are somewhat larger.

Figure 12:
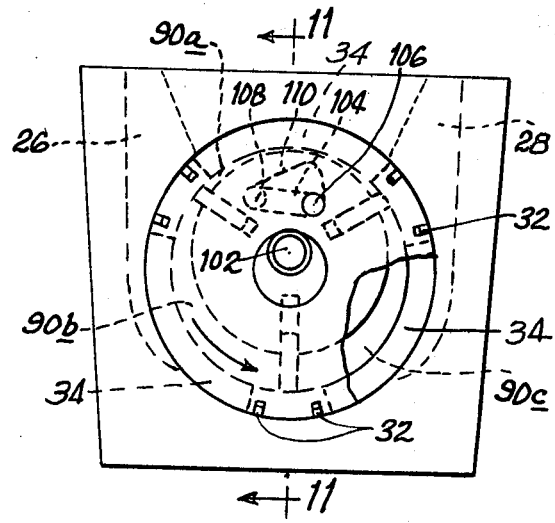
FIG. 12 is an end view with the end plate removed, the view being taken generally as indicated by the line 12—12 in FIG. 11.
Figure 14:
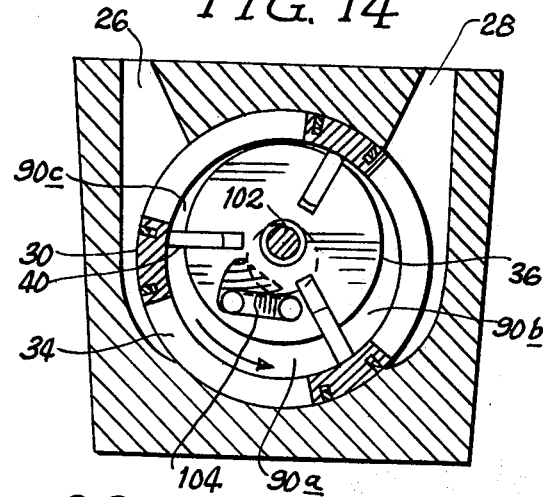
FIG. 14 is a section similar to FIG. 13 but showing the rotor in a changed position.

FIGS. 12, 13 and 14 illustrate three successive stages in the operation of the fluid power device 100. In this case, the fluid power device 100 is adapted to serve as a fluid power motor or pump. For use as a motor, the power fluid is supplied under pressure to the intake port 26. The expended power fluid is discharged through the exhaust port 28.

For use as a pump, the fluid is sucked into the intake port 26 and is discharged under pressure through the exhaust port 28. The cage rotor 30 is driven by mechanical power applied to the shaft 112.

As before, the vanes 40 divide the chamber 38 into three spaces, 90a, 90b and 90c of variable volume. The varying volume causes the entry and discharge of the fluid, into the spaces through the intake port 26, and then out of the spaces through the exhaust port 28.

As shown in FIG. 12, the space 90a is uppermost and thus is at minimum volume. The corresponding rotor port 34 is in transit between the exhaust port 28 and the intake port 26. The second space 90b is increasing in volume, due to the rotation of the main rotor 36, and thus is receiving fluid from the intake port 26. The third space 90c is decreasing in volume and is delivering fluid to the exhaust port 28. It will be understood that all three of the spaces 90a–c go through these successive stages of operation.

As shown in FIG. 13, both rotors 30 and 36 have been rotated through about 60 degrees. The volume of the space 90a is now increasing, and this space is receiving fluid from the intake port 26. The volume of the space 90b has reached a maximum, inasmuch as this space is at its lowermost position, most remote from the eccentric axis of the shaft 102. The corresponding rotor port 34 is in transit between the intake port 26 and the exhaust port 28. The third space 90c is decreasing in volume and is discharging fluid to the exhaust port 28.

As shown in FIG. 14, the rotors 30 and 36 have been rotated about 90 degrees beyond the positions of FIG. 13. The first space 90a is still receiving fluid from the intake port 26, but is approaching its maximum volume. A portion of the corresponding rotor port 34 is still opposite the intake port 26, but the rotor port is approaching the position in which it will go into transit between the intake port 26 and the exhaust port 28.

The second space 90b is decreasing in volume and is delivering fluid to the exhaust port 28. The third space 90c has gone past its minimum volume and is again increasing in volume, so as to take in fluid from the intake port 26.

It will be recognized that the fluid power device 100 provides a highly efficient motor or pump. For example, the device may be employed as a motor to run on compressed air. Mechanical power may be taken from the output shaft 112. Alternatively, the fluid power device 100 may be employed to compress air, in which case mechanical power is employed to drive the shaft 112.

As before, the surface speed between the vanes 40 and the inside of the cage rotor 30 is very low, because the main rotor 36 rotates with the cage rotor 30. There is only a slight oscillating movement between the vanes 40 and the cage rotor 30, due to the eccentric axis about which the main rotor 36 rotates. Thus, the wear on the vanes is very slight.

FIG. 15 and 16 illustrate still another fluid power device 120 which eliminates the cage rotor 30. It will be seen that the fluid power device 120 comprises a casing or block 122 having a generally cylindrical chamber 124 therein. The casing 122 is formed with intake and exhaust ports 126 and 128 which connect with the chamber 124. In this case the ports 126 and 128 are formed in the end wall or plate 129 on the casing 122.

A rotor 136 is rotatably mounted in chamber 124. The rotor 136 is quite similar to the rotor 36 of FIGS. 1–4. Thus, the rotor 136 is provided with a plurality of vanes 140 which are extensible and retractable. As before, three such vanes 140 are illustrated, but the number of vanes may be varied.

The rotor 136 is eccentrically disposed in chamber 124. As before, means are provided for orbiting the rotor 136. As illustrated in FIG. 15, such means comprise a crank pin 148 on a crankshaft 150. These elements are quite similar to the crank pin 48 and the shaft 50. A bearing 152 is mounted in the rotor 136 to receive the crank pin 148.

The rotor 136 is also caused to rotate about its own axis, which coincides with the axis of the crank pin 148. As illustrated in FIG. 15, the rotor 136 is coupled to a hollow shaft 151, received concentrically around the shaft 150. A tapering tooth or arm 153 extends outwardly from the hollow shaft 151, and is slidably received in a notch or recess 155, formed in the rotor 136. The sliding engagement between the tooth 153 and the walls of the recess 155 provides for the combined rotary and orbiting movement of the rotor 136.

As before, the rotor 135 is rotated and orbited at different but related speeds. Preferably, the orbiting speed is three times the rotary speed. Thus, the fluid power device 120 may utilize the same driving mechanism 60, as illustrated in FIGS. 1 and 2, between the crank shaft 150 and the hollow shaft 151 which corresponds to the hollow shaft 44 of FIG. 1.

As shown in FIGS. 15 and 16, the intake and exhaust ports 126 and 128 extend into the cylindrical chamber 124 through the end wall 129 on the casing 122. To cooperate with the ports 126 and 128, the rotor 136 is provided with ports or cut-outs 177 which extend between one end of the rotor 136 and the periphery thereof. The rotor ports 177 are adapted to move past the stationary ports 126 and 128. The ports 177 are relatively narrow, as compared with the spacing between the adjacent vanes 140. Thus, the ports 177 have the effect of limiting the angles of acceptance, for which the ports 126 and 128 are in communication with the chamber 124.

A spark plug or other fuel ignition device 186 is preferably mounted on the casing 122, in communication with the chamber 124. As before, a fuel injector may be employed instead of the spark plug 186, if the engine is to utilize a diesel cycle.

FIGS. 16A–L illustrate successive stages in the operation of the fluid power device 120. As before, the vanes 140 divide the chamber 124 into three spaces 190a, 190b and 190c of variable volume. It will suffice to trace the cycle of the space 190a, inasmuch as all three spaces go through the same cycle.

In FIG. 16A, the rotor 136 is orbited to its uppermost position, so that the volume of the space 190a is at a minimum. The corresponding rotor port 177 is in transit between the exhaust port 128 and the intake port 126.

As shown in FIGS. 16B and 16C, the space 190a is increasing in volume and is sucking the fuel-air mixture from the intake port 126. It will be understood that the fuel-air mixture may be supplied by a carburetor or the like.

As shown in FIG. 16D, the volume of the space 190a is at a maximum amount. The rotor port 177 has moved past the intake oprt 126, so that compression of the fuel-air mixture is about to begin.

FIGS. 16E, F and G represent three successive stages in the compression of the fuel-air mixture. The rotor port 177 is in transit between the intake and exhaust ports 126 and 128. In FIGS. 16E and F, space 190a is decreasing in volume. In FIG. 16G, the volume of the space 190a is at a minimum. Thus, the maximum compression of the fuel-air mixture has been achieved. At this point, the spark plug 186 is energized, to ignite the fuel. If a diesel cycle is employed, the fuel injection will take place at this point.

FIGS. 16H, I and J represent the expansion of the hot gaseous products of combustion. This is the power portion of the cycle in which the rotor 136 is driven by the pressure of the hot gases. The rotor port 177 is still in transit between the intake and exhaust ports 126 and 128. In FIGS. 16H and I, the volume of the space 190a is increasing. In FIG. 16J, the volume is at a maximum.

In FIG. 16K, the rotor port 177 has moved into communication with the exhaust port 128, so that the expended products of combustion are being discharged through the exhaust port. The space 190a is decreasing in volume, so that the exhaust gases are being forced out of the space through the exhaust port 128.

FIG. 16L represents a later stage in the exhaust portion of the cycle. The volume of the space 190a is still decreasing, and the rotor port 177 is still opposite the exhaust port 128. The exhaust gases continue to be forced out of the space 190a until the rotor port 177 moves past the exhaust port 128, as shown in FIG. 16A. This represents the completion of the cycle.

FIGS. 18 and 19 illustrate a modified fluid power device 220, which is the same as the device 120, except for the fact that the coupling elements 153 and 155, between the hollow shaft 151 and the rotor 136, are replaced with modified coupling elements. As shown in FIGS. 18 and 19, the shaft 151 is fitted with an external gear 253 which meshes with an internal gear 255, formed on the rotor 136. As the rotor 136 is orbited, the meshing point between the gears 253 and 255 travels around the gear 253.

The gear ratio of the gears 253 and 255 is taken is taken into account in designing the gear box 80, so that the combined ratio produces orbiting at three times the rotary speed of the rotor 136. The gears 253 and 255 provide the important advantage of causing the rotor 136 to rotate at a uniform angular velocity, without any irregularities. Thus, the gears 253 and 255 represent an improvement over the coupling elements 153 and 155 of FIG. 17.

FIG. 20 shows another modified fluid power device 320, which is the same as the fluid power device 120 of FIGS. 15–17, except for the fact that the rotor 136 is caused to orbit and rotate in opposite directions, rather than in the same direction. In both devices 120 and 320, the illustrated rotor 136 rotates counterclockwise. In the device 120, the crankshaft 150 also rotates counterclockwise. However, in the fluid power device 320 of FIG. 20, the crankshaft 150 rotates clockwise. As before, the rotary speed of the crankshaft 150 is three times the rotary speed of the rotor 136.

Because of the opposite direction in which the crankshaft 150 rotates, the fluid power device 320 is preferably provided with a second set of intake and exhaust ports 326 and 328, which are diametrically opposite from the first set of ports 126 and 128. A second spark plug 386 is also provided, and the first spark plug 186 is relocated, to a position between the intake port 126 and the exhaust port 328. The second spark plug 386 is located between the intake port 326 and the exhaust port 128. It will be understood that fuel injectors may be employed instead of the spark plugs, to provide a diesel engine.

FIGS. 20A–I illustrate the successive stages in the operation of the fluid power device or engine 320. As before, the vanes 140 provide three spaces or cells 190a, b and c of variable volume. Each rotor port 177 connects with one of the cells. It will be sufficient to trace the cycle of the cell 190a, inasmuch as the cycles of all three cells are the same.

As shown in FIG. 20A, the rotor 136 is orbited to its uppermost position, so that the cell 190a is at its minimum volume. The rotor port 177 is in transit between the exhaust port 128 and the intake port 126. Thus, the intake portion of the cycle is about to begin.

In FIG. 20B, the volume of the cell 190a is increasing, and the rotor port 177 is opposite the intake port 126. Thus, a mixture of fuel and air is being drawn into the cell 190a.

In FIG. 20C, the rotor port 177 has moved past the intake port 126 and is in transit between the intake port and the exhaust port 328. The volume of the cell 190a is decreasing, so that the mixture of fuel and air is being compressed.

FIG. 20D represents the point of maximum compression, in which the volume of the cell 190a is at a minimum. The crankshaft 150 has been rotated through three-quarters of a revolution from its initial position. At about this point in the cycle, the spark plug 186 is energized, so as to ignite the fuel. The power portion of the cycle then begins. In the case of a diesel engine, the fuel is injected at the point of maximum compression, as represented by FIG. 20D.

As shown in FIG. 20E, the cell 190a is increasing in volume, so as to expand the hot gaseous products of combustion, during the power portion of the cycle. The rotor port 177 is still in transit between the intake port 126 and the exhaust port 328.

As shown in FIG. 20F, the rotor port 177 has moved opposite the exhaust port 328, and the volume of the cell 190a is decreasing, so that the expended products of combustion are being discharged through the exhaust port 328.

FIG. 20G represents the end of the exhaust portion of the cycle, in which the volume of the cell 190a is again at a minimum. The rotor port 177 is in transit between the exhaust port 328 and the intake port 326. The crankshaft 150 has been rotated through one and one-half revolutions from its initial position, so that the rotor 136 has been orbited to its lowermost position.

It will be evident that the cell 190a has gone through one complete operating cycle, while being rotated through one half revolution. The cell goes through another operating cycle as it is rotated through another half revolution. During the second operating cycle, the rotor port 177 moves past the intake port 326 and the exhaust port 128. The second spark plug 386 is employed to ignite the fuel. Thus, for each revolution of the rotor 136, the cell 190a goes through two complete operating cycles. The same is true of the other two cells 190b and c.

FIG. 20H represents the intake portion of the second operating cycle, in which the rotor port 177 is opposite the intake port 326, so that a mixture of fuel and air will be drawn into the cell 190a.

As shown in FIG. 20I, the mixture is being compressed in the cell 190a. The rotor port 177 is in transit between the intake port 326 and the exhaust port 128. When the point of maximum compression is reached, the spark plug 386 is energized to ignite the fuel. The hot products of combustion are then expanded to derive power for rotating the rotor 136. Finally, the exhaust gases are discharged through the exhaust port 128.

Figure 21:
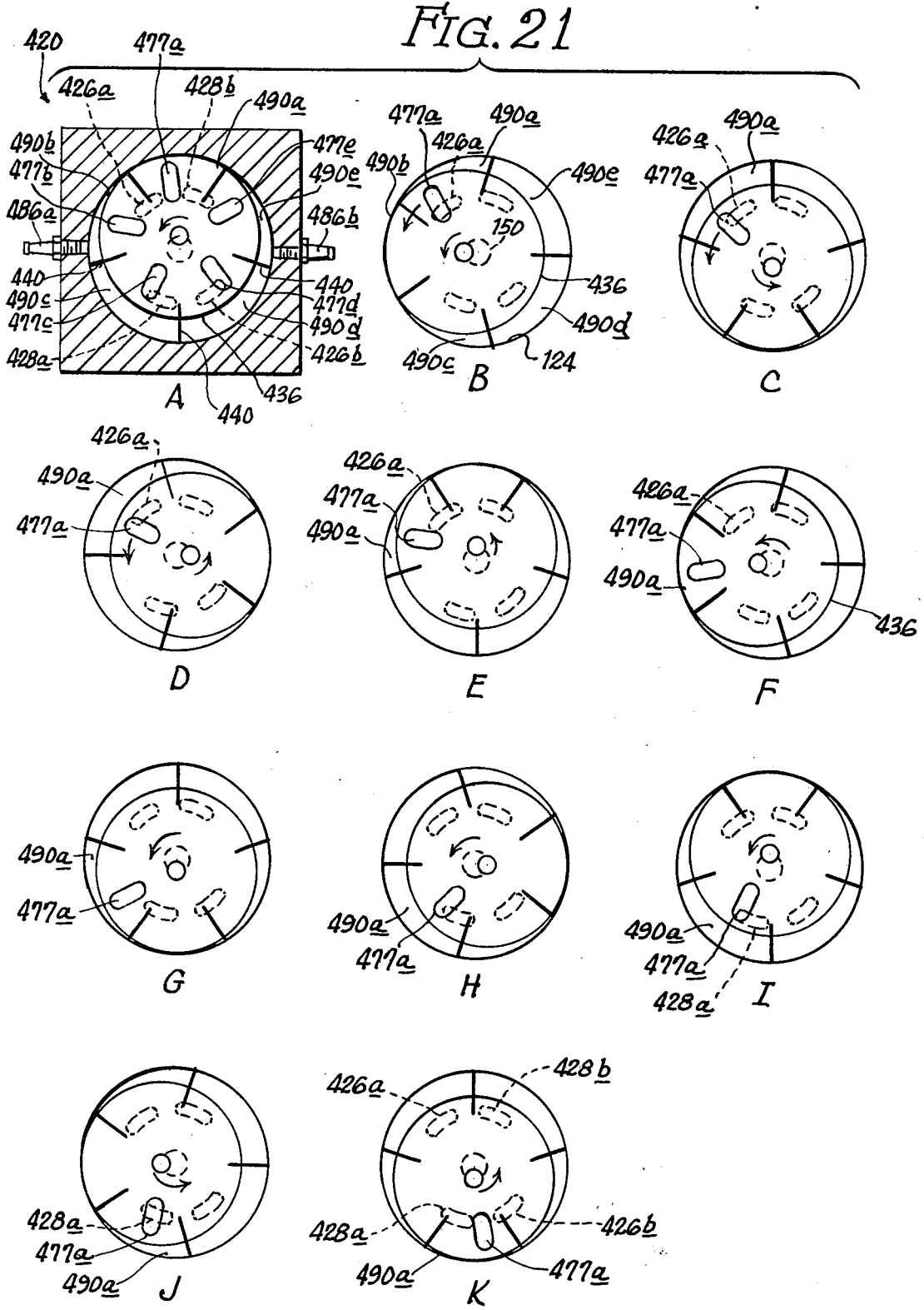
FIG. 21 is a series of diagrammatic views, A–K, similar to FIG. 16, but showing another modified construction having a rotor with five vanes, rather than three.

The motors of FIGS. 1–20 utilize three rotor vanes to provide three cells or spaces of variable volume. However, a larger number of vanes may be employed. Thus, FIG. 21 illustrates a modified motor 420 having a rotor 436 with five vanes 440, similar to the vanes 140, as already described. The motor 420 has two diametrically opposed intake ports 426a and b and two diametrically opposed exhaust ports 428a and b. These intake and exhaust ports are similar to the intake and exhaust ports already described. Rotor ports 477a, b, c, d and e are provided in the rotor 436 between the vanes 440. The rotor ports are similar to the rotor ports 177, already described.

The motor 420 is provided with two spark plugs 486a and b. The first spark plug 486a is disposed between the intake port 426a and the exhaust port 428a. The second spark plug 486b is between the intake and exhaust ports 426b and 428b.

The other components of the engine 420 may be substantially the same as previously described in connection with FIGS. 15–19. The same reference characters have been applied to corresponding components.

The five vanes 440 divide the chamber 124 into five cells 490a–e of variable volume. Because of the provision of five vanes, the crankshaft 150 is rotated at five times the speed of the rotor 436. In this way, the operating cycles of all five cells 490a–e will be exactly the same. In the motor 420 of FIG. 21, the rotor 436 and the crankshaft 150 is rotated in the same direction. During each revolution of the rotor 436, each of the cells 490a–e goes through two complete operating cycles.

FIGS. 21A–K represent the first operating cycle of the first cell 490a. FIG. 21A shows the beginning of the cycle, in which the rotor port 477a is in transit between the exhaust port 428b and the intake port 426a. FIGS. 21B and C represent successive stages in the intake portion of the cycle, in which the rotor port 477a is opposite the intake port 426a, so that the fuel-air mixture will be drawn into the cell 490a.

FIGS. 21D, E and F represent successive stages of the compression portion of the cycle. The rotor port 477a is in transit between the intake port 426a and the exhaust port 428a. FIG. 21F represents the point of maximum compression, in which the rotor 436 has been orbited through one and one-quarter revolutions. At approximately this point, the spark plug 486a is energized so as to ignite the fuel. For a diesel cycle, the fuel injector is energized.

FIGS. 21G and H represent successive stages in the power portion of the cycle. The hot gaseous products of combustion are being expanded in the cell 490a.

FIGS. 21I and J show successive stages of the exhaust portion of the cycle. The rotor port 477a has moved opposite the exhaust port 428a. FIG. 21K represents the end of the first operating cycle, in which the volume of the cell 490a is at a minimum, and the port 477a is in transit between the exhaust port 428a and the intake port 426b.

It will be evident that the first oeprating cycle of the cell 490a is completed during one half revolution of the rotor 436. The second operating cycle is completed during the second half revolution. During the second cycle, the rotor port 477a moves past the intake port 426b and exhaust port 428b. The second spark plug 486b is employed to ignite the fuel when the point of maximum compression is reached.

FIG. 22 illustrates still another modified motor 520, which is the same as the motor 420, except for the fact that the crankshaft 150 is rotated in the opposite direction, relative to the direction of rotation of the rotor 436. With this arrangement, it is preferred to provide three sets of intake ports 526a, b and c and three sets of exhaust ports 528a, b and c. Moreover, the motor 520 is provided with three spark plugs 586a, b and c, disposed between the corresponding intake and exhaust ports. Otherwise, the motor 520 of FIG. 22 is the same as the motor 420 of FIG. 21. Corresponding components have been given the same reference characters.

In the case of the motor 620 of FIG. 22, each of the five cells 490a–e goes through three complete operating cycles for each revolution of the rotor 436. During the first cycle, the cell 490a passes the intake and exhaust ports 526a and 528a. The first spark plug 586a is employed to ignite the fuel. FIGS. 22A–D represent successive stages in the operation of the engine 520, with particular reference to the first operating cycle of the first cell 490a. FIG. 22A shows the beginning of the first cycle, in which the rotor port 477a is in transit between the exhaust port 528c and the intake port 526a.

FIG. 22B represents the point of transition between the intake and compression portions of the cycle. The rotor port 477a has moved past the intake port 526a. The volume of the cell 490a is at a maximum. FIG. 22C represents the point of transition between the compression and power portions of the cycle. The volume of the cell 490a is at a minimum. Between the positions represented by FIGS. 22B and 22C, the charge in the displacement cell 490a has been compressed. At this point in the cycle, the spark plug 586a is energized to ignite the fuel. For a diesel cycle, the fuel injector is energized. FIG. 22D represents the transition between the power and exhaust portions of the cycle. The cell 490a has reached its maximum volume. The rotor port 477a is about to move into communication with the exhaust port 528a. The first operating cycle is completed by the movement of the rotor port 477a past the exhaust port 528a.

It will be understood that the cell 490a goes through two additional cycles for each revolution of the rotor 436. During the second cycle, the rotor port 477a passes the intake and exhaust ports 526b and 528b. The second spark plug 586b is employed to ignite the fuel. During the third cycle, the rotor port 477a passes the intake and exhaust ports 526c and 528c. The third spark plug 586c is employed to ignite the fuel. Similarly, each of the other cells 490b–e goes through three complete cycles for each revolution of the rotor 436.

In all of the above-described embodiments of the present invention, the rotors and the chambers are substantially cylindrical. However, the shape of the rotor and the rotor chamber may be varied. Thus, for example, the three-vaned rotor may be generally triangular in shape. However, it is preferred to employ cylindrical rotors and rotor chambers, because they can be machined inexpensively, yet with a high order of precision. All components of the fluid power devices can be manufactured easily and inexpensively.

Figure 23:
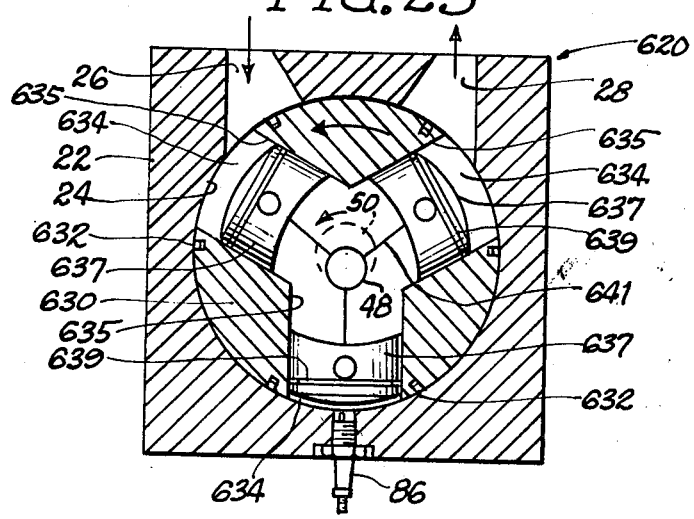
FIG. 23 is a view similar to FIG. 3, but showing another modified engine utilizing pistons.

It has been shown that the displacement cells may be formed by a rotor, which is movable in a rotor chamber. A three-vaned rotor will produce three displacement cells. However, FIG. 23 illustrates a modified fluid power device in which the displacement cells are formed by pistons, adapted to reciprocate in piston cylinders, as will be described in detail presently. The fluid power device or engine 620 is generally similar to the engine 20 of FIGS. 1–4. Corresponding components in FIG. 23 have been given the same reference characters as in FIGS. 1–4. The engine 620 has a modified cage rotor 630 which is provided with a plurality of rotary seals 632, similar to the seals 32 of FIG. 1. A plurality of ports 634 are formed in the cage rotor 630.

A plurality of piston cylinders or bores 635 are formed in the cage rotor 630. The ports 634 are formed by the outer ends of the bores 635. Instead of the rotor 36, the engine 620 is provided with a plurality of generally cylindrical pistons 637, adapted to reciprocate in the cylinders 635. Piston rings or other seals 639 are provided on the pistons 637. The crank 48 and the crankshaft 50 are the same as in FIG. 1, but are employed to reciprocate the pistons 637. Thus, connecting rods 641 are provided between the pistons 637 and the crank 48.

The illustrated engine 620 has three cylinders 635 and three pistons 637. As before, the crankshaft 50 rotates in the same direction as the cage rotor 630, but at three times the rotary speed thereof. With this arrangement, only a single set of intake and exhaust ports 26 and 28 is required. The crankshaft 50 could be rotated in the opposite direction, but in that case two sets of intake and exhaust ports would be required. During each revolution of the cage rotor 630, each piston 637 makes four strokes, constituting two complete reciprocations. These strokes may be designated intake, compression, power, and exhaust. During the intake stroke, the piston draws a mixture of fuel and air into the corresponding cylinder 635 through the intake port 26. In the case of a diesel cycle, only air is drawn in. The charge of fuel and air is compressed during the compression stroke and is ignited by the spark plug 86, which is the same as in FIG. 3. In the case of a diesel cycle, the spark plug is replaced with a fuel injector.

During the power stroke, the piston moves radially inwardly, so as to provide for expansion of the hot gaseous products of combustion. The power thus generated is applied to the crankshaft 50. During the exhaust stroke, the spent products of combustion are discharged from the cylinder 635 through the exhaust port 28.

In FIG. 23, one of the piston cylinders 635 is in communication with the intake port 26. The corresponding piston 637 is making its intake stroke. The lowermost piston 637 is at the end of its compression stroke and is about to begin its power stroke. At approximately this point, the spark plug 86 is energized to ignite the fuel.

The third piston 637 is making its exhaust stroke. The corresponding cylinder 635 is in communication with the exhaust port 28.

Although the illustrated engine 620 has three pistons, to form three displacement cells, it will be understood that a larger number of pistons may be employed. Generally, the number of pistons may be three or any larger odd number.

One of the advantages of the present invention resides in the fact that no valving is required, because porting is employed instead of valving. This is a particular advantage in connection with internal combustion engines, in which the porting of the present invention operates at low pressures and temperatures. The porting does not present any cooling problems. Thus, the porting obviates the problems encountered in connection with the operation of valves at high temperatures and pressures in internal combustion engines.

As already indicated, the number of vanes on the vaned rotor may be varied. Rotors having three and five vanes have been illustrated and described specifically. Generally, operative engines may be produced when the number of vanes is three, five or any larger odd number. The number of displacement cells corresponds to the number of vanes. The orbital speed of the rotor is related to the rotary speed, so that the operating cycles of all of the displacement cells are identical. This generally requires that the ratio between the orbital speed and the rotary speed be the same as the number of vanes. When this relationship exists, the crankshaft high point, and all other points in the cycle of the crankshaft, occur identically for each of the displacement cells. The crankshaft makes a complete revolution for the advance of each displacement cell to an identical point of operation. Thus, for a rotor having three vanes, and hence three displacement cells, there must be three crankshaft revolutions for every rotor revolution. Similarly, a rotor having five vanes requires that the crankshaft be rotated through five revolutions for each rotor revolution.

Each displacement cell may go through one or more complete operating cycles for each revolution of the rotor. The number of cycles depends upon the number of displacement cells, and the direction of orbiting movement, relative to the rotary movement of the rotor movement of the rotor. As an internal combustion engine, the fluid power device utilizes a four-stroke or four-part cycle, comprising strokes or portions for intake, compression, power, and exhaust. To achieve the four-stroke cycle, the crankshaft of the engine should rotate through two complete revolutions, or 720 degrees, relative to each displacement cell. However, consideration must be given to the fact that each displacement cell is being continuously rotated. The rotation of the crankshaft is at a higher speed than the rotation of the displacement cell. A four-stroke cycle will be completed when the relative rotation between the crankshaft and the displacement cell reaches 720 degrees. The rotation of the crankshaft and the rotation of the displacement cell are additive when the directions of rotation are opposite, but are substractive when the same direction of rotation prevails in both cases.

The engines of FIGS. 16, 20, 21 and 22 may be considered by way of illustration. The engine 120 of FIG. 16 has a rotor with three vanes. The rotor and the crankshaft rotate in the same direction. The crankshaft rotates through three revolutions for each revolution of the rotor. Thus, three revolutions of the crankshaft are required before there has been rotation of the crankshaft through two complete revolutions relative to the rotor. Meanwhile, the rotor has turned through one complete revolution. Thus, there is only one operating cycle for each revolution of the rotor. Accordingly, only one set of intake and exhaust ports is required.

The engine of FIG. 20 also has three vanes, but the crankshaft rotates in the opposite direction, relative to the rotation of the rotor. The rotary speed of the crankshaft is three times that of the rotor. With this arrangement, only one and one-half revolutions of the crankshaft are required in order to produce two complete revolutions of the crankshaft relative to the rotor. In the meantime, the rotor rotates through one-half revolution. Thus, there are two complete operating cycles for each revolution of the rotor. Accordingly, two sets of intake and exhaust ports are required.

The engine 420 of FIG. 21 has five vanes. The crankshaft rotates in the same direction as the rotor, but at five times the speed of the rotor. Two and one-half rotations of the crankshaft are required to produce two complete revolutions of the crankshaft relative to the rotor. Meanwhile, the rotor has rotated through one-half revolution. Thus there are two complete cycles for each revolution of the rotor, and two sets of intake and exhaust ports are required.

The engine of FIG. 22 also has five vanes, but the crankshaft rotates in the opposite direction, relative to the rotor. Thus, the crankshaft needs to rotate through only 600 degrees to produce a relative rotation of 720 degrees between the crankshaft and the rotor. Meanwhile, the rotor rotates through 120 degrees, or one-third of one revolution. Accordingly, there are three complete cycles for each revolution of the rotor. Three sets of intake and exhaust ports are required.

The same principles are applicable when the displacement cells are formed by pistons, adapted to reciprocate in piston cylinders. The number of pistons may be three, or any larger odd number. The ratio between the crankshaft speed and the rotor speed corresponds to the number of pistons. Each piston may go through one or more complete four-stroke cycles for each revolution of the rotor, depending upon the number of pistons and the direction of rotation of the crankshaft, relative to the rotor.

In the engine of FIG. 23, there are three pistons. The crankshaft rotates in the same direction as the rotor. Accordingly, the rotation of the rotor is subtractive with respect to the rotation of the crankshaft. For each rotation of the rotor, the crankshaft rotates through three complete revolutions, but the relative movement between the crankshaft and the rotor is only two complete revolutions, which represents only one operating cycle. Thus, only one set of intake and exhaust ports is required.

If the direction of rotation of the crankshaft is reversed, the rotation of the rotor is additive, with respect to the rotation of the crankshaft. For each rotation of the rotor, the relative movement between the crankshaft and the rotor amounts to four revolutions, or two complete operating cycles. Thus, two sets of intake and exhaust ports are required.

The same analysis can be employed to determine the number of intake and exhaust ports required for an engine with five, seven or any other suitable number of displacement cells. An odd number of displacement cells is required to produce a symmetrical internal combustion engine utilizing a four stroke cycle. Generally, the number of sets of intake and exhaust ports will be given by the following formula, when the crankshaft and the rotor rotate in the same direction:

$$\frac{n-1}{2}$$

In the above formula, $n$ is the number of displacement cells. When a vaned rotor is utilized, $n$ is the number of vanes. When pistons are utilized, $n$ is the number of pistons.

The following formula applies when the crankshaft and the rotor rotate in opposite directions:

$$\frac{n+1}{2}$$

It will be understood that one spark plug or fuel injector is provided for each set of intake and exhaust ports. The term "fuel activator" may be employed as a generic designation to include spark plugs, fuel injectors and other similar devices.

An even number of displacement cells results in a non-symmerical construction. With an even number of displacement cells, it is possible to cause each displacement cell to operate through one or more four-stroke cycles, followed by a two-stroke cycle. The two-stroke cycle may be employed to compress air, or for some other auxiliary purpose. The compressed air can be used to supercharge the four-stroke portion of the engine.

Various other modifications, alternative constructions and equivalents may be employed as will be understood by those skilled in the art.

I claim:
1. In a fluid power device, the combination comprising first means forming a generally cylindrical chamber, a rotor disposed in said chamber, second means mounting said rotor for rotation about an axis which is eccentric relative to the axis of said chamber, a plurality of extensible and retractable vanes mounted on said rotor for engaging the inside of said chamber, said chamber having a plurality of fluid-carrying ports therein, and orbiting means for causing said rotor to orbit in said chamber in such manner that the axis of said rotor traverses a circular orbital path about the axis of said chamber so as to cause the extension and retraction of said vanes.

2. A combination according to claim 1,
in which said first means is stationary,
and in which said rotor is rotatable in said chamber relative to said first means.

3. A combination according to claim 1,
in which said first means comprise an additional rotor,
means mounting said additional rotor for rotation about the axis of said chamber,
third means forming an additional generally cylindrical chamber,
said additional rotor being closely received and rotatable in said additional chamber,
said additional chamber having additional fluid-carrying ports therein.

4. A combination according to claim 3,
including means for causing said first mentioned rotor to rotate with said additional rotor.

5. A combination according to claim 3,
including means for causing said first mentioned rotor to rotate with said additional rotor,
and driving means connected between said orbiting means and said additional rotor for causing the orbiting of said rotor at a rotary speed which is related to but different from the rotary speed of said additional rotor.

6. A combination according to claim 1,
in which said ports include intake and exhaust ports for carrying the fluid into and out of said chamber.

7. A combination according to claim 1,
in which said rotor is formed with additional ports for communicating with said first mentioned ports in said chamber.

8. A combination according to claim 1,
in which said orbiting means comprise a rotary shaft having an eccentric crank connected to said rotor.

9. A combination according to claim 1,
including driving means connected between said orbiting means and said rotor for causing said rotor to orbit at a rotary speed which is related to but different from the rotary speed of said rotor.

10. In a fluid power device,
the combination comprising a casing having a first generally cylindrical chamber therein,
said casing having intake and exhast ports therein connecting with said first chamber,
a generally cylindrical gate rotor closely received in said first chamber,
means supporting said gate rotor for rotation about the axis of said first chamber,
said gate rotor having a second chamber therein,
said gate rotor having additional ports therein connecting with said second chamber and movable past said intake and exhaust ports,
a main rotor disposed in said second chamber,
means supporting said main rotor for rotation about an axis which is eccentric relative to the axis of said first chamber,
a plurality of extensible and retractable vanes mounted on said main rotor for engaging the inside of said second chamber,
said vanes being effective to divide said second chamber into a plurality of spaces of variable volume,
means for causing said main rotor to rotate with said gate rotor,
and orbiting means for causing said main rotor to orbit in said second chamber in such manner that the axis of said main rotor traverses a circular orbital path about the axis of said first chamber so as to cause extension and retraction of said vanes while changing the volume of each of said spaces.

11. A combination according to claim 10,
including driving means connected between said orbiting means and said gate rotor for causing said main rotor to orbit at a rotary speed which is related to but different from the rotary speed of said gate rotor.

12. A combination according to claim 10,
in which said orbiting means comprises a rotary shaft having an eccentric crank thereon supporting said main rotor.

13. A combination according to claim 12,
including driving means connected between said rotary shaft and said gate rotor for causing rotation of said shaft at a rotary speed which is related to but different from the rotary speed of said gate rotor.

14. A combination according to claim 10,
in which one of said additional ports in said gate rotor connects with each of said spaces of variable volume formed between said vanes.

15. A combination according to claim 10,
in which said main rotor comprises three of said vanes dividing said additional chamber into three spaces of variable volume,
said gate rotor having three of said additional ports connecting with said spaces of variable volume,
and driving means connected between said orbiting means and said gate rotor for causing the orbiting of said rotor at a rotary speed which is three times the rotary speed of said gate rotor.

16. A combination according to claim 1,
including an odd number of said vanes,
said orbiting means being constructed and arranged such that the ratio of the orbiting speed to the rotary speed of said rotor corresponds to the number of vanes.

17. A combination according to claim 16,
in which said orbiting means is constructed and arranged such that said rotor orbits and rotates in the same direction,
said fluid carrying ports comprising a number of sets of intake and exhaust ports given by the formula $$\frac{n-1}{2}$$

where $n$ is the number of vanes.

18. In a fluid power device, the combination comprising
first means forming a generally cylindrical chamber,
a rotor disposed in said chamber,
second means mounting said rotor for rotation about an axis which is eccentric relative to the axis of said chamber,
a plurality of extensible and retractable vanes mounted on said rotor for engaging the inside of said chamber,
said chamber having a plurality of fluid-carrying ports therein,
and orbiting means for causing said rotor to orbit in said chamber about the axis thereof so as to cause the extension and retraction of said vanes,
the number of said vanes being odd,
said orbiting means being constructed and arranged such that the ratio of the orbiting speed to the rotary speed of said rotor corresponds to the number of vanes,
said orbiting means being constructed and arranged such that said rotor orbits and rotates in opposite direction,
said fluid carrying ports comprising a number of sets of intake and exhaust ports given by the formula $$\frac{n+1}{2}$$

where $n$ is the number of vanes.

19. A combination according to claim 1,
in which said rotor is provided with three of said vanes,
and in which said orbiting means is constructed and arranged such that the orbital speed of said rotor is three times the rotary speed thereof.

20. A combination according to claim 19,
in which said orbiting means is constructed and arranged such that said rotor is orbited and rotated in the same direction,
said fluid carrying ports including a single set of intake and exhaust ports.

21. In a fluid power device, the combination comprising
first means forming a generally cylindrical chamber,
a rotor disposed in said chamber,
second means mounting said rotor for rotation about an axis which is eccentric relative to the axis of said chamber,
a plurality of extensible and retractable vanes mounted on said rotor for engaging the inside of said chamber,
said chamber having a plurality of fluid-carrying ports therein,
and orbiting means for causing said rotor to orbit in said chamber about the axis thereof so as to cause the extension and retraction of said vanes,
said rotor being provided with three of said vanes,
said orbiting means being constructed and arranged such that the orbital speed of said rotor is three times the rotary speed thereof,
said orbiting means being constructed and arranged such that said rotor orbits and rotates in opposite directions,
said fluid carrying ports comprising two sets of intake and exhaust ports.

22. A combination according to claim 1,
in which said rotor is provided with five of said vanes,
and in which said orbiting means is constructed and arranged such that the orbital speed of said rotor is five times the rotary speed thereof.

23. A combination according to claim 22,
in which said orbiting means is constructed and arranged such that said rotor orbits and rotates in the same direction,
said fluid carrying ports comprising two sets of intake and exhaust ports.

24. In a fluid power device, the combination comprising
first means forming a generally cylindrical chamber,
a rotor disposed in said chamber,
second means mounting said rotor for rotation about an axis which is eccentric relative to the axis of said chamber,
a plurality of extensible and retractable vanes mounted on said rotor for engaging the inside of said chamber,
said chamber having a plurality of fluid-carrying ports therein,
and orbiting means for causing said rotor to orbit in said chamber about the axis thereof so as to cause the extension and retraction of said vanes,
said rotor being provided with five of said vanes,
said orbiting means being constructed and arranged such that the orbital speed of said rotor is five times the rotary speed thereof,
said orbiting means being constructed and arranged such that said rotor orbits and rotates in opposite directions,
said fluid carrying ports comprising three sets of intake and exhaust ports.

References Cited

UNITED STATES PATENTS

| | | | |
|---|---|---|---|
| 1,504,995 | 8/1924 | Voreaux | 103—161 |
| 2,430,362 | 11/1947 | Parine | 103—161 |
| 2,658,456 | 11/1953 | Wahlmark | 103—121 X |
| 2,734,461 | 2/1956 | Porte | 103—121 |
| 2,891,482 | 6/1959 | Menon | 103—121 |
| 3,316,814 | 5/1967 | Charlson | 91—56 |
| 3,348,529 | 10/1967 | Assum | 123—8 |
| 3,417,706 | 12/1968 | Eickmann | 103—136 |
| 2,716,948 | 9/1955 | Cuny | 103—161 |

DONLEY J. STOCKING, Primary Examiner

W. J. KRAUSS, Assistant Examiner